(12) United States Patent
Itagaki et al.

(10) Patent No.: US 11,374,427 B2
(45) Date of Patent: *Jun. 28, 2022

(54) PORTABLE ELECTRONIC DEVICE AND WIRELESS ELECTRIC POWER TRANSMISSION DEVICE

(71) Applicant: TDK Corporation, Tokyo (JP)

(72) Inventors: Kazuya Itagaki, Tokyo (JP); Shinji Higuma, Tokyo (JP)

(73) Assignee: TDK Corporation, Tokyo (JP)

(*) Notice: Subject to any disclaimer, the term of this patent is extended or adjusted under 35 U.S.C. 154(b) by 598 days.

This patent is subject to a terminal disclaimer.

(21) Appl. No.: 16/344,685

(22) PCT Filed: Nov. 1, 2016

(86) PCT No.: PCT/JP2016/082466
§ 371 (c)(1),
(2) Date: Apr. 24, 2019

(87) PCT Pub. No.: WO2018/083736
PCT Pub. Date: May 11, 2018

(65) Prior Publication Data
US 2020/0021127 A1    Jan. 16, 2020

(51) Int. Cl.
*H01F 27/24* (2006.01)
*H02J 7/02* (2016.01)
(Continued)

(52) U.S. Cl.
CPC ............. *H02J 7/025* (2013.01); *H01F 38/14* (2013.01); *H02J 50/10* (2016.02); *H04R 1/1025* (2013.01);
(Continued)

(58) Field of Classification Search
CPC .......... H02J 7/025; H02J 50/10; H02J 7/0042; H02J 7/007; H01F 38/14; H01F 27/24;
(Continued)

(56) References Cited

U.S. PATENT DOCUMENTS 10,439,424 B2 * 10/2019 Itagaki ................. H02J 7/0042
2011/0115429 A1 * 5/2011 Toivola .................. H02J 50/10
320/108
(Continued)

FOREIGN PATENT DOCUMENTS

CN      102545393 A     7/2012
CN      103858307 A     6/2014
(Continued)

OTHER PUBLICATIONS

International Search Report of International Application No. PCT/JP2016/082466, dated Dec. 6, 2016.

*Primary Examiner* — Nghia M Doan
(74) *Attorney, Agent, or Firm* — Leydig, Voit & Mayer Ltd.; John Augustyn (57) ABSTRACT

A portable electronic device includes a housing, a secondary battery disposed inside a tip portion of the housing, and a power receiving coil unit disposed around the secondary battery. The power receiving coil unit has a first coil in which a conductive wire is helically wound around a first magnetic body and a second coil in which a conductive wire is wound helically around a second magnetic body. The first magnetic body and the second magnetic body are disposed between an outer side surface of the secondary battery and an inner side surface of the housing. The first coil and the second coil are located at mutually different positions in a direction around an axis of the secondary battery and are interconnected such that opposed magnetic flux is generated in respective winding axes when current flows the first and second coils.

19 Claims, 6 Drawing Sheets

(51) Int. Cl.
*H02J 50/10* (2016.01)
*H01F 38/14* (2006.01)
*H04R 1/10* (2006.01)
*H04R 25/00* (2006.01)

(52) U.S. Cl.
CPC ....... *H04R 25/602* (2013.01); *H04R 2225/31* (2013.01)

(58) Field of Classification Search
CPC ................ H04R 1/1025; H04R 25/602; H04R 2225/31; H04R 25/609; Y02E 60/10; H01M 10/46
See application file for complete search history.

(56) References Cited

U.S. PATENT DOCUMENTS

| | | |
|---|---|---|
| 2012/0153741 A1 | 6/2012 | Yamamoto et al. |
| 2014/0176060 A1 | 6/2014 | Vorperian et al. |
| 2014/0176067 A1 | 6/2014 | Suzuki et al. |
| 2015/0372498 A1 | 12/2015 | Ichikawa et al. |
| 2016/0049698 A1* | 2/2016 | Kawano ................ H02J 50/12 320/108 |
| 2016/0365751 A1 | 12/2016 | Hatanaka et al. |

FOREIGN PATENT DOCUMENTS

| | | |
|---|---|---|
| JP | 2010-098187 A | 4/2010 |
| JP | 2010-098188 A | 4/2010 |
| JP | 2014-150628 A | 8/2014 |
| JP | 2014-230441 A | 12/2014 |
| JP | 2015-002580 A | 1/2015 |
| JP | 2015-159664 A | 9/2015 |

\* cited by examiner

1 WIRELESS ELECTRIC POWER TRANSMISSON DEVICE

1 WIRELESS ELECTRIC POWER TRANSMISSON DEVICE

| α | 0° | 10° | 20° | 30° | 40° | 50° | 60° | 70° |
|---|---|---|---|---|---|---|---|---|
| β | 180° | 160° | 140° | 120° | 100° | 80° | 60° | 40° |
| Vout | 3.63V | 3.69V | 3.69V | 4.56V | 5V | 5V | 5V | 5V |

PORTABLE ELECTRONIC DEVICE AND WIRELESS ELECTRIC POWER TRANSMISSION DEVICE

TECHNICAL FIELD

The present invention relates to a portable electronic device capable of wireless charging and a wireless electric power transmission device wirelessly transmitting electric power between a portable electronic device and a power feeding device.

BACKGROUND ART

Portable electronic devices including wearable devices such as earphones, headsets, and hearing aids are recently increasingly miniaturized, and power sources are increasingly implemented as secondary batteries. When a power source is a secondary battery, it is conceivable that a method of battery charge includes inserting a connector of a charging cable into a portable electronic device; however, the operation of inserting the connector is cumbersome. If the structure of the connector is made easily insertable, this makes waterproofing difficult. In this regard, battery charge utilizing wireless electric power transmission eliminates the cumbersome operation of inserting a connector to the portable electronic device and makes it easy to achieve a waterproof structure.

Patent document 1 relates to a wireless charging device and includes the following disclosure: "a charger has a power feeding cut core around which a power feeding coil is wound, a transmission circuit part, and a power source capable of power feeding and is housed in a first outer case; a portable device has a power receiving core around which a power receiving coil is wound, a rechargeable/dischargeable secondary battery, a power receiving circuit part, and a system circuit part and is housed in a second outer case; the power receiving core is surrounded by the power feeding cut core; the power receiving core and the power feeding cut core are electromagnetically coupled to each other across the second outer case; an AC magnetic field induced in the power feeding coil is formed from the power feeding cut core to a cylindrical cut core; and an alternating current is induced in the power receiving coil so that the battery of the portable device is charged with electric power by transferring the electric power from the power source of the charger from the power feeding coil to the power receiving coil".

PRIOR ART DOCUMENT

Patent Document

Patent Document 1: Japanese Laid-Open Patent Publication No. 2015-2580

SUMMARY OF THE INVENTION

Problem to be Solved by the Invention

To apply wireless electric power transmission to increasingly miniaturized portable electronic devices, a power receiving coil must be disposed while avoiding an increase in size of a portable electronic device. Patent Document 1 includes no disclosure in terms of devising of avoiding an increase in size of a portable electronic device when the power receiving coil is disposed.

The present invention was conceived in view of the situations and it is therefore an object of the present invention to provide a portable electronic device having a configuration advantageous for miniaturization and a wireless electric power transmission device including the same.

Means for Solving Problem

An aspect of the present invention is a portable electronic device. The portable electronic device comprises:
a housing; a secondary battery disposed inside a tip portion of the housing; and a power receiving coil unit disposed around the secondary battery in the housing, wherein
the power receiving coil unit includes a first coil in which a conductive wire is helically wound around a first magnetic body and a second coil in which a conductive wire is helically wound around a second magnetic body, and
the first and second coils are located at mutually different positions in a direction around an axis of the secondary battery and are interconnected such that magnetic fluxes are generated oppositely to each other in respective winding axes when a current flows therethrough.

Each of the winding axes of the first and second coils may include a portion extending along the direction around the axis of the secondary battery.

The first and second coils may be arranged such that an angle of 120 degrees or less is formed by a first imaginary line connecting a pair of end portions of the first coil and a second imaginary line connecting a pair of end portions of the second coil.

The first and second coils may be arranged such that an angle of 100 degrees or less is formed by a first imaginary line connecting a pair of end portions of the first coil and a second imaginary line connecting a pair of end portions of the second coil.

The first and second coils each may have the winding axis curved along a side surface shape of the secondary battery.

The first and second magnetic bodies may be integrated with each other.

The first and second magnetic bodies may be separated from each other and are respectively arranged on one side and the other side across a central portion in a width direction of the housing.

The first and second coils may be respectively arranged on one side and the other side across the central portion in the width direction of the housing.

The first and second coils may have a clearance of 3 mm to 7 mm between the end portions on the tip side of the housing.

The first and second coils may have a clearance of 38% to 100% of a diameter of the secondary battery between the end portions on the tip side of the housing.

The portable electronic device may comprise a charging circuit charging the secondary battery with an output electric power of the power receiving coil unit, wherein
the charging circuit has a voltage conversion coil, and
the voltage conversion coil includes a conductive wire helically wound around a magnetic body between the end portions of the first and second coils on the tip side of the housing.

Another aspect of the present invention is a wireless electric power transmission device. The wireless electric power transmission device comprises:
the portable electronic device; and a power feeding device, wherein the power feeding device includes a power feeding coil and a housing that contains the power feeding coil, wherein the housing includes a concave part capable of at least partially accommodating the portable electronic device, and the power feeding coil helically turns around a circumference of the concave part.

The power feeding device may include a cylindrical third magnetic body covering an outer circumference of the power feeding coil.

The power feeding device may include a fourth magnetic body extending from one end portion of the third magnetic body toward an opening center on the side of the one end portion of the third magnetic body and a fifth magnetic body extending from the other end portion of the third magnetic body toward an opening center on the side of the other end portion of the third magnetic body.

The fourth magnetic body may have one end opening portion surrounding the concave part of the housing, the fifth magnetic body has the other end opening portion located on the bottom side of the concave part, and wherein an opening width of the one end side opening portion and an opening width of the other end side opening portion are both narrower than a circumferential width of the power feeding coil.

The opening width of the other end opening portion may be narrower than the opening width of the one end opening portion.

It is to be noted that any arbitrary combination of the above-described structural components as well as the expressions according to the present invention changed among a system and so forth are all effective as and encompassed by the present aspects.

Effect of the Invention

The present invention can provide a portable electronic device having a configuration advantageous for miniaturization and a wireless electric power transmission device including the same.

EMBODIMENT FOR CARRYING OUT THE INVENTION

Preferred embodiments of the present invention will now be described in detail with reference to the drawings. The same or equivalent constituent parts, members, etc., shown in the drawings are designated by the same reference numerals and will not be repeatedly described as appropriate. The embodiments are not intended to limit the invention but are mere exemplifications, and all features or combinations thereof described in the embodiments do not necessarily represent the intrinsic natures of the invention.

Figure 1:
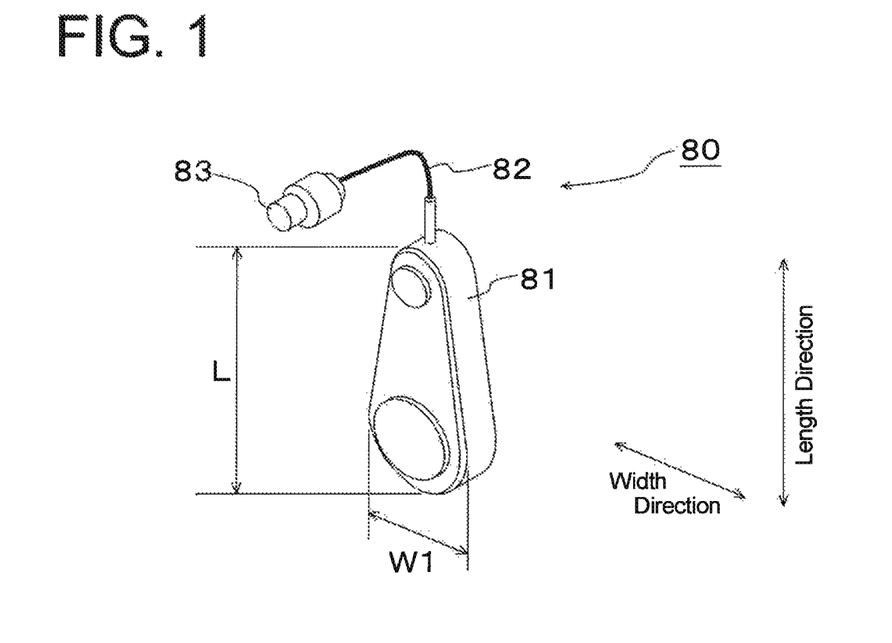
FIG. 1 is a perspective view of a portable electronic device 80 according to an embodiment of the present invention.

An embodiment of the present invention will be described with reference to FIGS. 1 to 10. FIG. 1 defines a length direction and a width direction of a portable electronic device 80. As shown in FIG. 1, a portable electronic device 80 is a hearing aid in this embodiment and has an inserting part 83 for the ear at a tip of a cable 82 led out from a housing 81. The housing 81 is an insulating resin molded body having a length of L and a width of W1, for example, and can be fastened to user's clothes by a locking means such as a clip not shown. The portable electronic device 80 may be of a type hooked to the ear or inserted into the ear.

Figure 2:
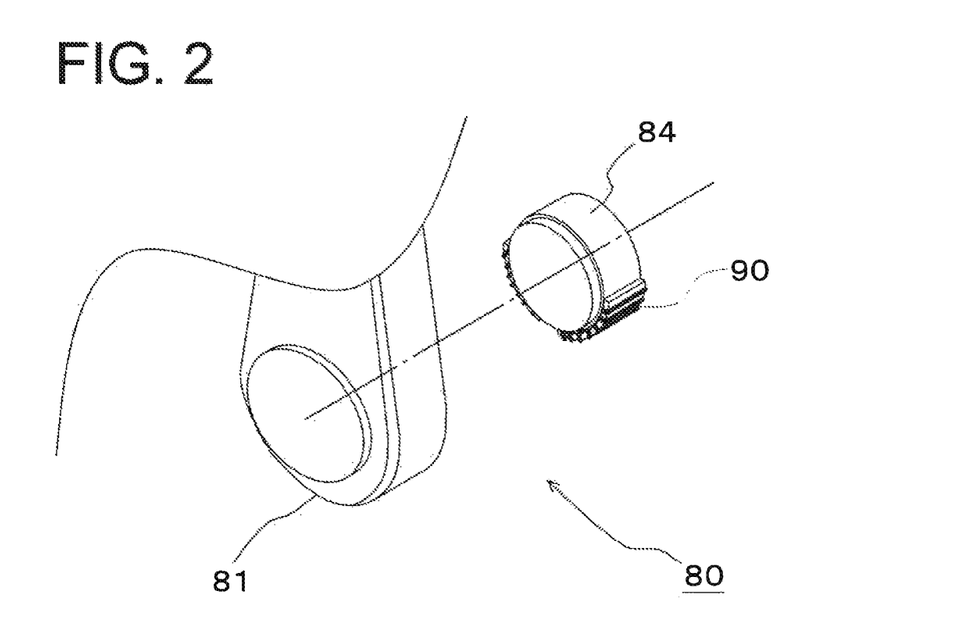
FIG. 2 is an enlarged exploded perspective view of a main portion of the portable electronic device 80.
Figure 7:
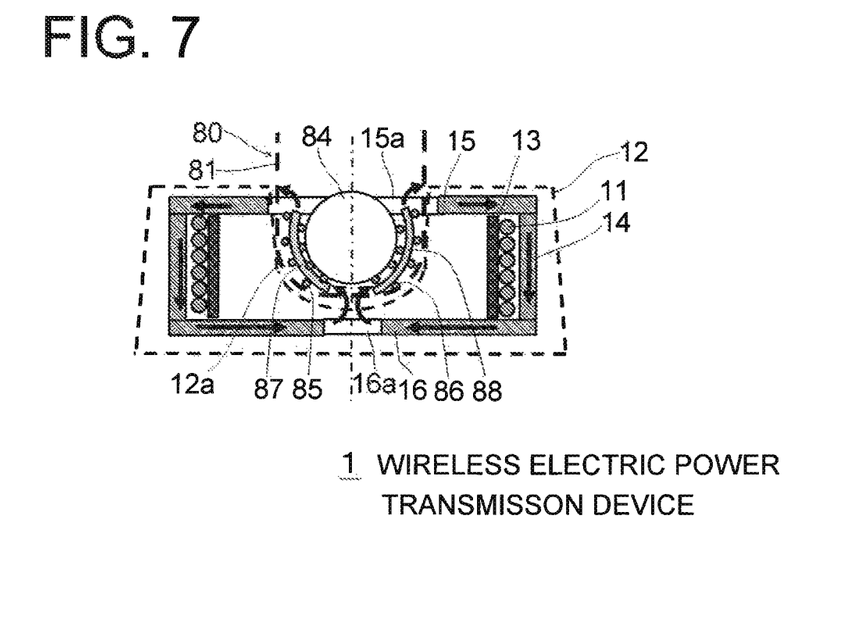
FIG. 7 is a schematic cross-sectional view of a main portion of the wireless electric power transmission device 1, showing a flow of magnetic flux associated with wireless electric power transmission.
Figure 9:
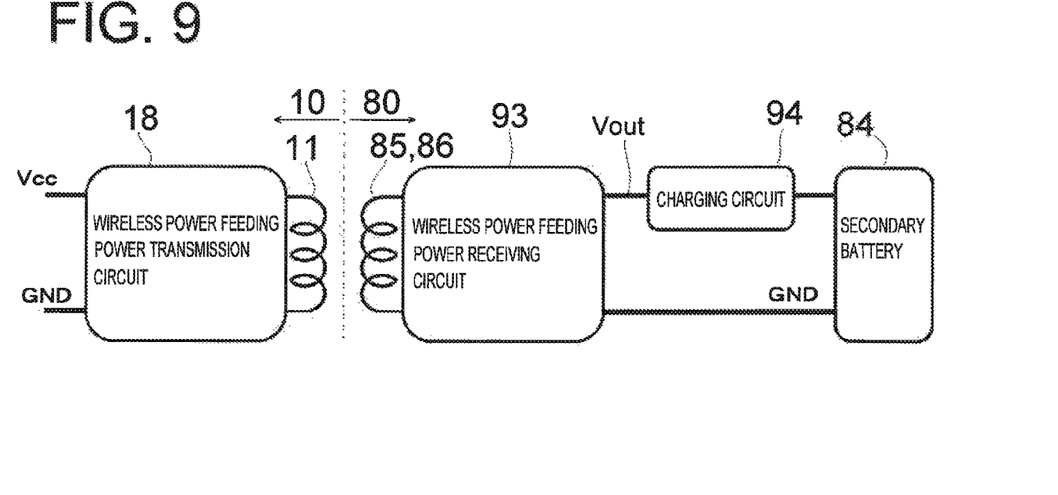
FIG. 9 is a schematic circuit block diagram of the wireless electric power transmission device 1.

The portable electronic device 80 has a secondary battery 84 such as a lithium ion secondary battery and a power receiving coil unit 90 for wireless power reception shown in FIG. 2, a power receiving circuit 93 and a charging circuit 94 shown in FIG. 9, and functional components such as a microphone not shown, inside the housing 81. The term "wireless" means that no contact is made between conductors. As shown in FIG. 7, the secondary battery 84 is disposed inside a tip portion (one end portion in the length direction) of the housing 81. The power receiving coil unit 90 is disposed around the secondary battery 84 in the housing 81. The power receiving coil unit 90 is preferably kept within the height range of the secondary battery 84.

Figure 3:
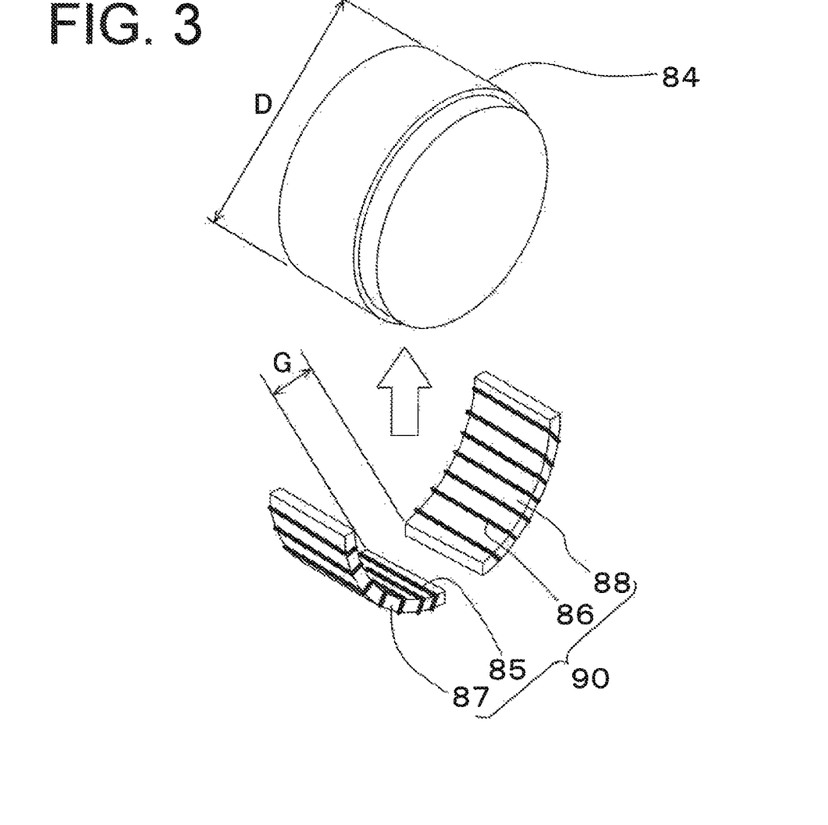
FIG. 3 is a perspective view of a disassembled state of a secondary battery 84 and a power receiving coil unit 90 of the portable electronic device 80.
Figure 4:
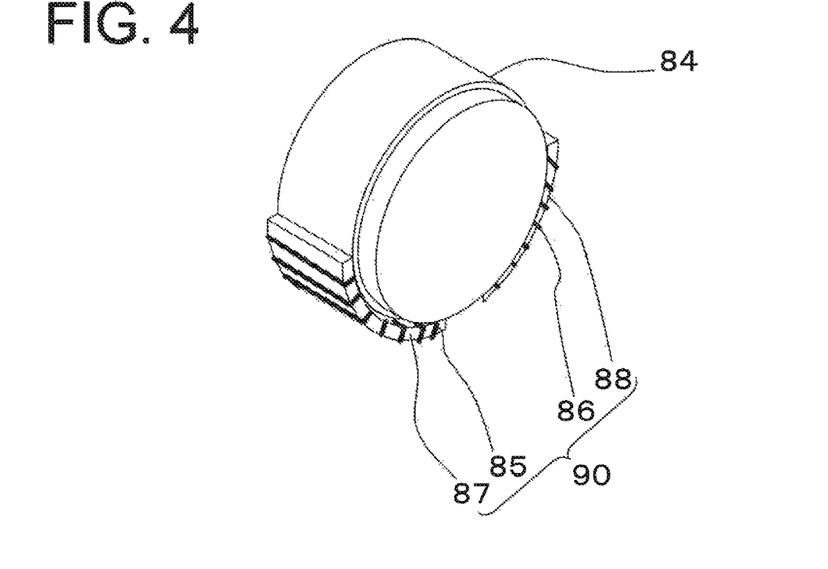
FIG. 4 is a perspective view of an assembled state of the secondary battery 84 and the power receiving coil unit 90.

As shown in FIGS. 3 and 4, the power receiving coil unit 90 includes a first coil 85 in which a conductive wire is helically wound around a first magnetic body 87 and a second coil 86 in which a conductive wire is helically wound around a second magnetic body 88. The first magnetic body 87 and the second magnetic body 88 are, for example, sintered bodies of magnetic powder of ferrite or a flexible magnetic sheet of a metallic magnetic material mixed with polymer. The first magnetic body 87 and the second magnetic body 88 are separated from each other and are respectively arranged on one side and the other side across a central portion in the width direction of the housing 81. The first magnetic body 87 and the second magnetic body 88 have a thin plate shape and are curved along a side surface (outer circumferential surface) shape of the secondary battery 84, i.e., along a direction around an axis of the secondary battery 84 (curved into a cylindrical side surface shape in this embodiment). As a result, the first coil 85 and the second coil 86 respectively wound around the first magnetic body 87 and the second magnetic body 88 have winding axes also curved along the side surface shape of the secondary battery 84 (the side surface shape as viewed in an axial direction). The first coil 85 and the second coil 86 are respectively arranged on one side and the other side across the central portion in the width direction of the housing 81. The first coil 85 and the second coil 86 preferably have a clearance G (FIG. 3) of 3 mm to 7 mm between end portions on the tip side of the housing 81. The clearance G (FIG. 3) is preferably 38% to 100% of a diameter D (FIG. 3) of the secondary battery 84.

As shown in FIG. 7, the first magnetic body 87 and the second magnetic body 88 are arranged between an outer side surface (outer circumferential surface) of the secondary battery 84 and an inner side surface of the tip portion of the housing 81 facing the outer side surface of the secondary battery 84. The first coil 85 and the second coil 86 are arranged between the outer side surface of the secondary battery 84 and the inner side surface of the tip portion of the housing 81 facing the outer side surface of the secondary battery 84. The first coil 85 and the second coil 86 are located at mutually different positions in the direction around the axis of the secondary battery 84 and are interconnected such that magnetic fluxes are generated oppositely to each other in respective winding axes when a current flows therethrough (interconnection lines of the first coil 85 and the second coil 86 are not shown). Specifically, the first coil 85 and the second coil 86 are interconnected such that the magnetic flux generated by the first coil 85 and the magnetic flux generated by the second coil 86 are opposite to each other in the first magnetic body 87 and the second magnetic body 88, respectively, when a current flows through the first coil 85 and the second coil 86 connected in series.

Figure 5:
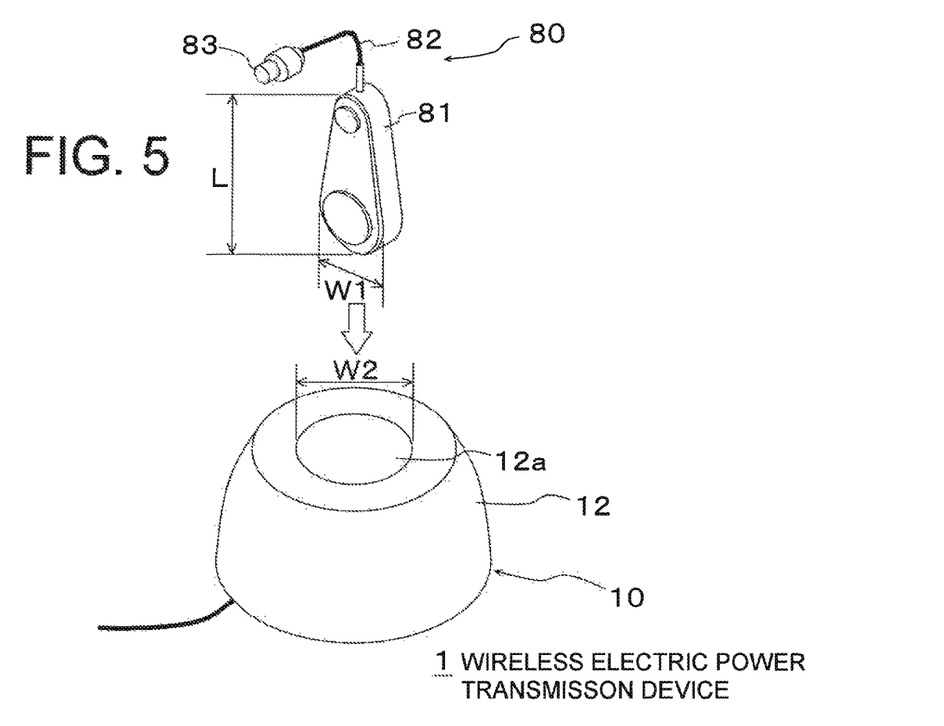
FIG. 5 is a perspective view showing a method of arranging the portable electronic device 80 with respect to a wireless power feeding device 10 in the wireless electric power transmission device 1 according to the embodiment of the present invention.

As shown in FIGS. 5 and 7, the wireless power feeding device 10 includes a housing 12 that contains a power transmission coil unit. The housing 12 is a resin molded body, for example, and has a concave part 12*a* capable of at least partially accommodating the portable electronic device 80. An opening width W2 (FIG. 5) of the concave part 12*a* is shorter than a longitudinal dimension L of the portable electronic device 80 and longer than a lateral dimension W1 of the portable electronic device 80.

Figure 6:
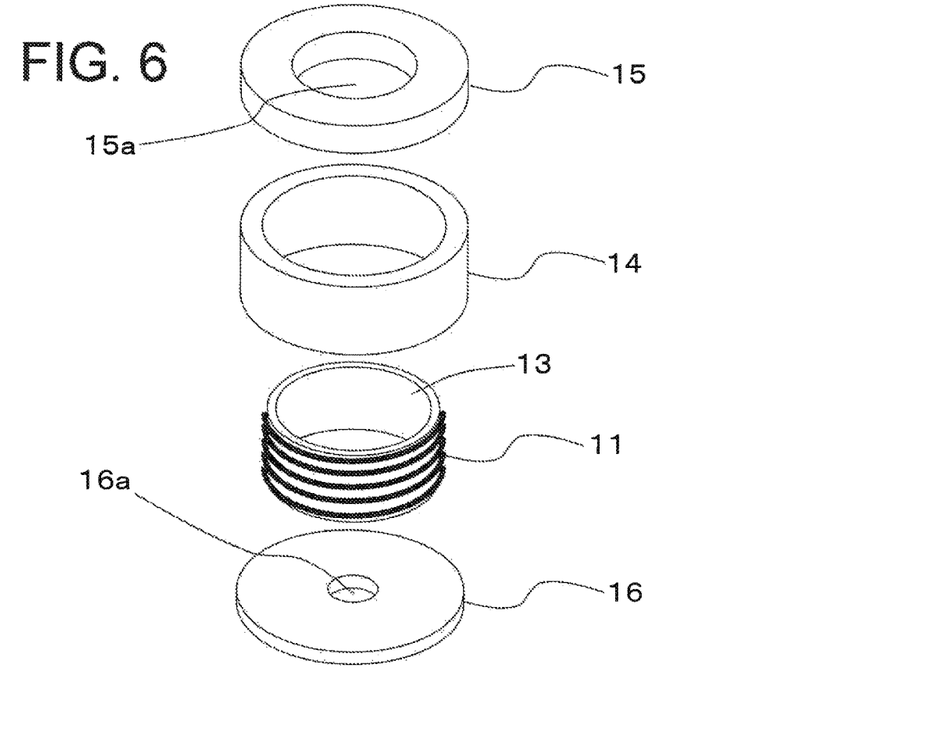
FIG. 6 is an exploded perspective view of a power transmission coil unit of the wireless power feeding device 10.

As shown in FIG. 6, the power transmission coil unit of the wireless power feeding device 10 includes a power feeding coil (power transmission coil) 11, a bobbin 13 around which the power feeding coil 11 is wound, a cylindrical magnetic body 14 as a third magnetic body, a flat plate-shaped magnetic body 15 as a fourth magnetic body, and a flat plate-shaped magnetic body 16 as a fifth magnetic body. The bobbin 13 is a cylindrical resin molded body, for example, and is disposed to surround the circumference of the concave part 12*a*. The power feeding coil 11 is wound around the outer circumferential surface of the bobbin 13 and helically turns around the circumference of the concave part 12*a*. The bobbin 13 may have respective flange parts at both ends of the power feeding coil 11. The power feeding coil 11, the bobbin 13, the cylindrical magnetic body 14, the flat plate-shaped magnetic body 15, and the flat plate magnetic body 16 may be embedded (integrated) in the housing 12 by insert molding or may be held in an internal space of the housing 12 without insert molding.

The cylindrical magnetic body 14 is a ferrite sintered body, for example, and is disposed (held by the housing 12) to closely cover the outer circumference of the power feeding coil 11. The flat plate-shaped magnetic body 15 is a ferrite sintered body, for example, and extends from an upper end (one end) portion of the cylindrical magnetic body 14 toward an upper opening center of the cylindrical magnetic body 14. The flat plate-shaped magnetic body 16 is a ferrite sintered body, for example, and extends from a lower end (the other end) portion of the cylindrical magnetic body 14 toward a lower opening center of the cylindrical magnetic body 14.

The flat plate-like magnetic body 15 has an upper opening portion (one end opening portion) 15*a* in the central portion thereof surrounding the concave part 12*a* of the housing 12. The flat plate-like magnetic body 16 has a lower opening portion (other end opening portion) 16*a* in the central portion thereof located under the concave part 12*a*. An opening width of the upper opening portion 15*a* and an opening width of the lower opening portion 16*a* are both narrower than a circumferential width of the power feeding coil 11. The opening width of the lower opening portion 16*a* is narrower than the opening width of the upper opening portion 15*a*.

Figure 8:
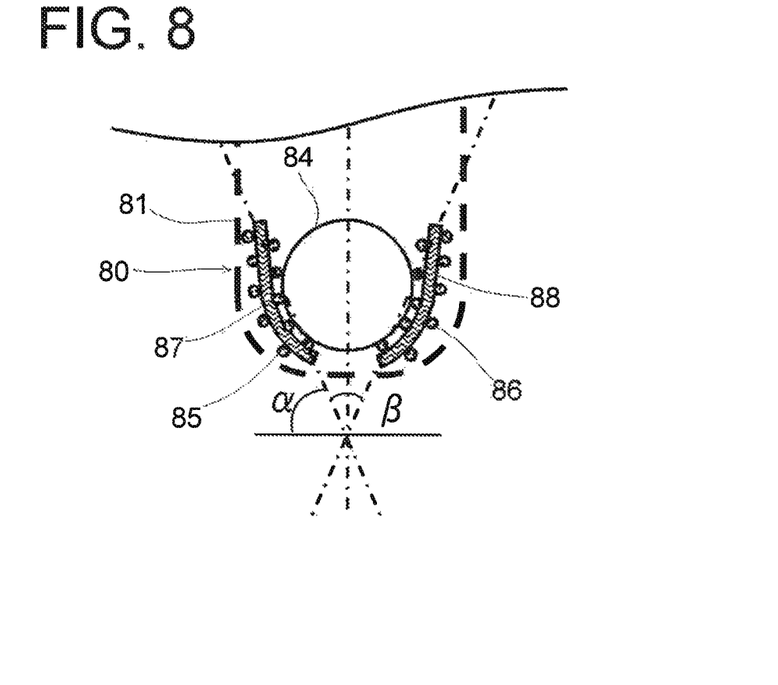
FIG. 8 is an enlarged schematic cross-sectional view of a tip portion of the portable electronic device 80 of FIG. 7 and is an explanatory view of angles α, β indicative of inclinations of a first coil 85 and a second coil 86.

In FIG. 8, an angle $\beta$ is an angle formed by a first imaginary line connecting a pair of end portions of the first coil 85 and a second imaginary line connecting a pair of end portions of the second coil 86. An angle $\alpha$ is an angle formed by each of the first and second virtual lines relative to the width direction of the portable electronic device 80. The angles $\alpha$, $\beta$ have a relationship of $\alpha \times 2 + \beta = 180°$.

In a circuit block diagram shown in FIG. 9, the wireless power feeding device 10 has a power transmission circuit 18 energizing the power feeding coil 11. The portable electronic device 80 includes a power receiving circuit 93 for rectifying and smoothing induced voltages generated in the first coil 85 and the second coil 86, and a charging circuit 94 charging the secondary battery 84 by using a voltage from the power receiving circuit 93. A magnetic field (see an arrow of FIG. 7) generated by energizing the power feeding coil 11 with the power transmission circuit 18 causes induced voltages to occur in the first coil 85 and the second coil 86, and the induced voltages allow the power receiving circuit 93 and the charging circuit 94 to supply charging power to the secondary battery 84. The induced voltages generated in the first coil 85 and the second coil 86 are coincide with each other in terms of polarity (phase) due to the interconnection described above, and the absolute value of the composite voltage is the sum of the absolute values of the respective induced voltages.

Figure 10:
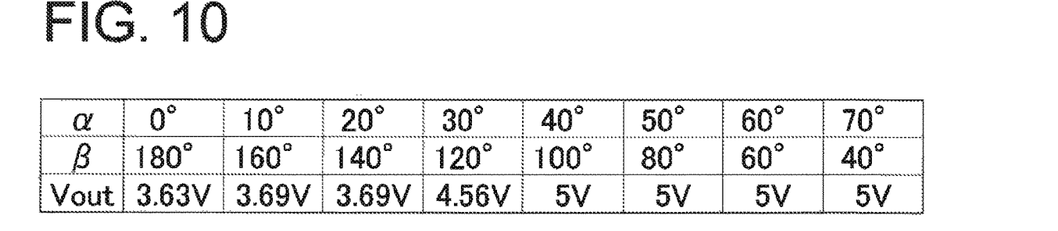
FIG. 10 is a table showing a relationship between the angles α, β of FIG. 8 and an output voltage Vout of a power receiving circuit 93 shown in FIG. 9.

FIG. 10 is a table showing a relationship between the angles $\alpha$, $\beta$ of FIG. 8 and an output voltage Vout of the power receiving circuit 93 shown in FIG. 9. From FIG. 10, when the angle $\beta$ is 120 degrees or less (the angle $\alpha$ is 30 degrees or more), the output voltage Vout of the power receiving circuit 93 is 4.5 V or more. For charging by the charging circuit 94, an input voltage to the charging circuit 94 is preferably 4.5 V or more. Therefore, the angle $\beta$ is preferably 120 degrees or less (the angle $\alpha$ is 30 degrees or more). Additionally, when the angle $\beta$ is 100° or less (the angle $\alpha$ is 40° or more), the output voltage of the power receiving circuit 93 is an upper limit of 5 V. Therefore, the angle $\beta$ is more preferably 100° or less (the angle $\alpha$ is 40° or more).

According to this embodiment, the following effects can be produced.

(1) The power receiving coil unit 90 is disposed between the side surface of the secondary battery 84 and the inner surface of the housing 81, and the power receiving coil unit 90 can be disposed even if a restriction is imposed due to inability to ensure a coil arrangement space above and under the secondary battery 84, and a wireless power receiving function can be implemented even in the increasingly miniaturized portable electronic device 80. Since the portable electronic device 80 has the wireless power receiving function, a space for battery exchange (such as a latch for opening and closing a lid) or a space for inserting a cable for charging is no longer necessary, which makes a space available for the arrangement of the power receiving coil unit 90.

(2) since the power feeding coil 11 in the non-contact power feeding device 10 helically turns around the circumference of the concave part 12a at least partially accommodating the portable electronic device 80, a magnetic field can be generated entirely in the concave part 12a, and if the first coil 85 and the second coil 86 of the portable electronic device 80 are in the concave part 12a, the portable electronic device 80 can be charged regardless of the placement. Particularly, since the two power receiving coils are included as the first coil 85 and the second coil 86 to achieve a configuration facilitating power reception with respect to magnetic fluxes different in direction from each other, so that the risk of not being able to receive power due to placement (posture) of the portable electronic device 80 is reduced. Therefore, according to this embodiment, the portable electronic device 80 can easily appropriately be placed (in a chargeable posture) on the wireless power feeding device 10, and a user does not need to pay particular attention to the placement form of the portable electronic device 80 relative to the wireless power feeding device 10, resulting in a smaller burden associated with charging and higher convenience. Additionally, the risk of not being able to transmit electric power due to misplacement of the portable electronic device 80 relative to the wireless power feeding device 10 can significantly be reduced.

Although the present invention has been described by way of the embodiments, it will be appreciated by those skilled in the art that the constituent parts or processing processes of the embodiments could variously be modified without departing from the scope defined in claims. Hereinafter, variants will be referred to.

Figure 11:
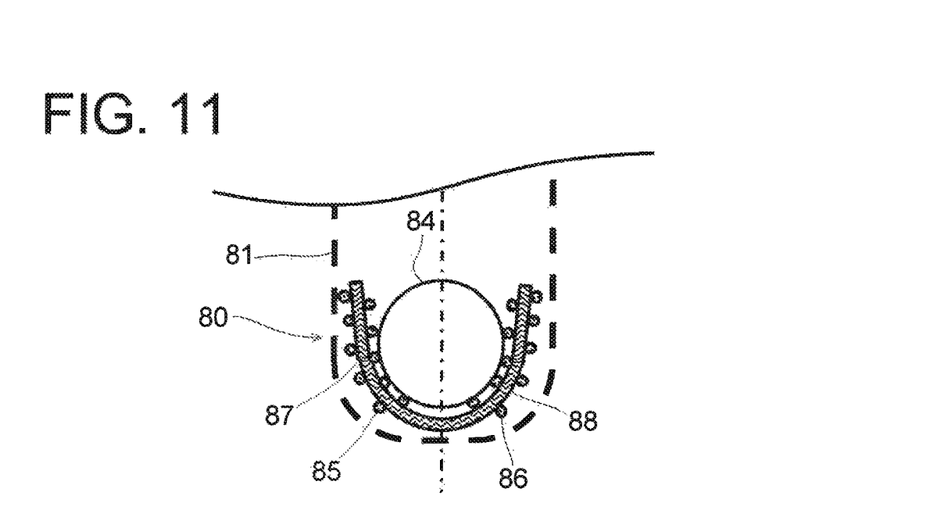
FIG. 11 is a schematic cross-sectional view showing a first modification of the portable electronic device 80.

FIG. 11 is a schematic cross-sectional view showing a first modification of the portable electronic device 80. This modification is different from the embodiment described above in that the first magnetic body 87 and the second magnetic body 88 are coupled to and integrated with each other and is the same with respect to the other points. The integrated magnetic bodies are the first magnetic body 87 on one side and the second magnetic body 88 on the other side relative to the center in the width direction of the portable electronic device 80. This modification can produce the same effect as the embodiment.

Figure 12:
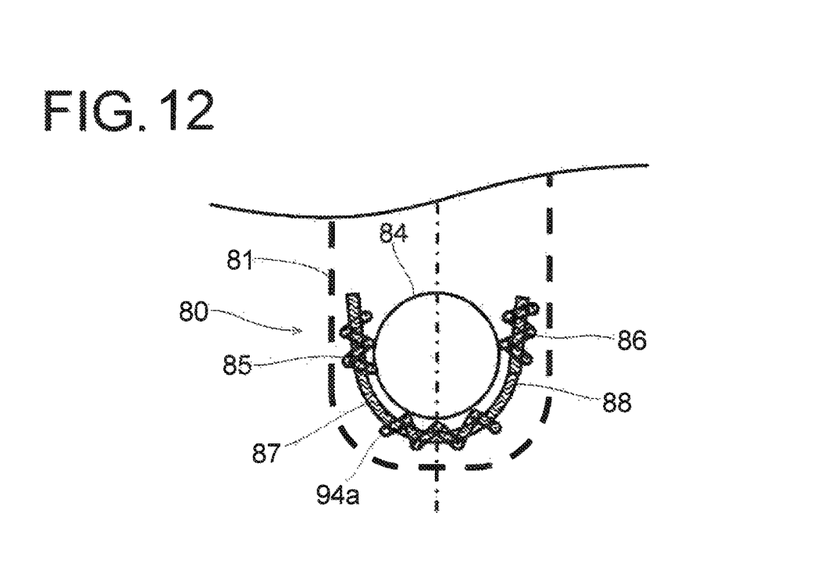
FIG. 12 is a schematic cross-sectional view showing a second modification of the portable electronic device 80.
Figure 13:
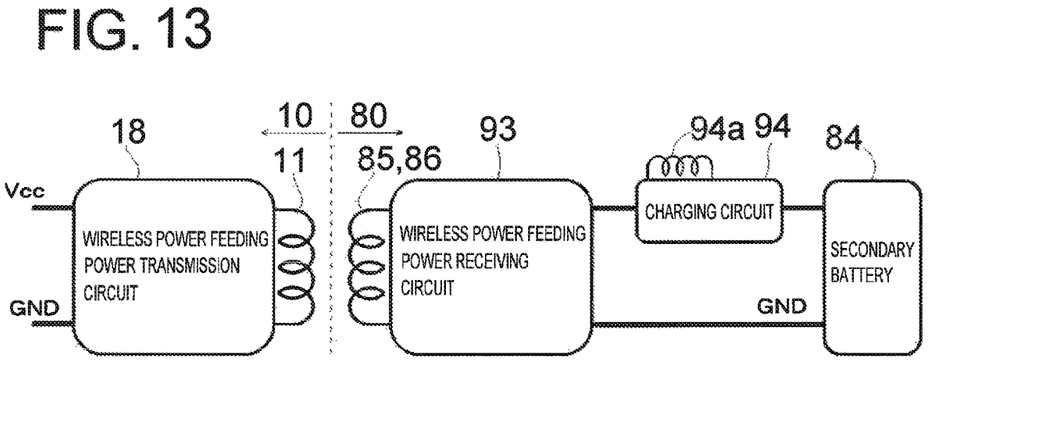
FIG. 13 is a schematic circuit block diagram of a wireless electric power transmission device according to the second modification.

FIG. 12 is a schematic cross-sectional view showing a second modification of the portable electronic device 80. FIG. 13 is a schematic circuit block diagram of a wireless electric power transmission device according to the second modification. This modification is different from the first modification in that a voltage conversion coil 94a is added and is the same with respect to the other points. The voltage conversion coil 94a is a coil for voltage conversion disposed in the charging circuit 94 and is a coil constituting a portion of a DC-DC converter. The voltage conversion coil 94a has a conductive wire helically wound around over the first magnetic body 87 and the second magnetic body 88 between the end portions of the first coil 85 and the second coil 86 on the tip side of the housing 81. This modification can produce the same effect as the embodiment. Additionally, according to this modification, a space is advantageously saved as compared to when the voltage conversion coil 94a is separately disposed at another location in the housing 81. The voltage conversion coil 94a may be wound around only one of the first magnetic body 87 and the second magnetic body 88. In this case, a gap may exist between the first magnetic body 87 and the second magnetic body 88 as in the embodiment.

In the portable electronic device 80, the conductive wires constituting the first coil 85 and the second coil 86 as well as the voltage conversion coil 94a of the second modification may be respective conductors disposed on a flexible substrate. The winding axes of the first coil 85 and the second coil 86 as well as the voltage conversion coil 94a of the second modification are not limited to those curved along the side surface of the secondary battery 84 and may have a linear shape. In this case, the winding axes may have a portion extending along the direction around the axis of the secondary battery 84. The first magnetic body 87 and the second magnetic body 88 are not limited to those curved along the side surface of the secondary battery 84 and may have a flat plate shape. In the case of a flat plate shape, the magnetic bodies may be parallel to the tangent plane with respect to the side surface of the secondary battery 84.

In the wireless power feeding device 10, the cylindrical magnetic body 14 and the flat plate-shaped magnetic bodies 15, 16 have a role of strengthening the magnetic field generated inside the power feeding coil 11 and increasing a power feeding efficiency; however, any or all of them may not be included as long as the power feeding can be achieved. The lower opening portion 16a of the flat plate-shaped magnetic body 16 may not be included.

EXPLANATIONS OF LETTERS OR NUMERALS 1 wireless electric power transmission device, 10 wireless power feeding device, 11 power feeding coil (power transmission coil), 12 housing, 12a concave part, 13 bobbin, 14 cylindrical magnetic body (third magnetic body), 15 flat plate-shaped magnetic body (forth magnetic body), 16 flat plate-shaped magnetic body (fifth magnetic body), 80 portable electronic device, 81 housing, 82 cable, 83 inserting part, 84 secondary battery, 90 power receiving coil unit

The invention claimed is:

1. A portable electronic device comprising:
a housing having a tip portion;
a secondary battery having a central axis and disposed inside the tip portion of the housing; and
a power receiving coil unit disposed around the secondary battery, in the housing, and including first and second magnetic bodies, a first coil including a conductive wire that is helically wound around the first magnetic body and a second coil including a conductive wire that is helically wound around the second magnetic body, wherein
the first and second coils are located at mutually different angular positions around the central axis of the secondary battery, and
the first and second coils are interconnected that oppositely directed magnetic flux is generated by the first and second coils along respective winding axes of the first and second coils when a current flows through the first and second coils.

2. The portable electronic device according to claim 1, wherein each of the winding axes of the first and second coils includes a portion extending around the central axis of the secondary battery.

3. The portable electronic device according to claim 2, wherein the secondary battery has a curved side surface about the central axis of the secondary battery and the winding axes of the first and second coils are curved along the curved side surface of the secondary battery.

4. The portable electronic device according to claim 1, wherein the first and second coils are angularly positioned around the secondary battery that an angle of no more than 120 degrees is formed between a first imaginary line connecting a pair of end portions of the first coil and a second imaginary line connecting a pair of end portions of the second coil.

5. The portable electronic device according to claim 4, wherein clearance between each end portion of the first and second coils on a tip side of the housing is within a range from 3 mm to 7 mm.

6. The portable electronic device according to claim 4, wherein the secondary battery has a diameter and clearance between each end portion of the first and second coils on a tip side of the housing is within a range from 38% to 100% of the diameter of the secondary battery.

7. The portable electronic device according to claim 1, wherein the first and second coils are angularly positioned around the secondary battery that an angle of no more than 100 degrees is formed between a first imaginary line connecting a pair of end portions of the first coil and a second imaginary line connecting a pair of end portions of the second coil.

8. The portable electronic device according to claim 1, wherein the secondary battery has a curved side surface about the central axis of the secondary battery and the winding axes of the first and second coils are curved along the curved side surface of the secondary battery.

9. The portable electronic device according to claim 1, wherein the first and second magnetic bodies are integrated with each other.

10. The portable electronic device according to claim 1, wherein the first and second magnetic bodies are separated from each other and are respectively located on first and second sides of the secondary battery, across a central portion, in a width direction, of the housing.

11. The portable electronic device according to claim 1, wherein the first and second coils are respectively located on first and second sides of the secondary battery, across a central portion, in the width direction, of the housing.

12. The portable electronic device according to claim 1, wherein each of the first and second coils has end portions and clearance between each of the end portions of the first and second coils on a tip side of the housing is within a range from 3 mm to 7 mm.

13. The portable electronic device according to claim 1, wherein the secondary battery has a diameter, each of the first and second coils has end portions, and clearance between each of the end portions of the first and second coils on a tip side of the housing is within a range from 38% to 100% of the diameter of the secondary battery.

14. The portable electronic device according to claim 1, wherein each of the first and second coils has end portions and further comprising a charging circuit for charging the secondary battery with output electric power of the power receiving coil unit, wherein the charging circuit has a voltage conversion coil, and
the voltage conversion coil includes a third magnetic body and a conductive wire helically wound around the third magnetic body, and between each of the end portions of the first and second coils on a tip side of the housing.

15. A wireless electric power transmission device comprising:
a portable electronic device comprising:
a housing having a tip portion;
a secondary battery having a central axis and disposed inside the tip portion of the housing; and
a power receiving coil unit disposed around the secondary battery, in the housing, and including first and second magnetic bodies, a first coil including a conductive wire that is helically wound around the first magnetic body and a second coil including a conductive wire that is helically wound around the second magnetic body,
wherein the first and second coils are located at mutually different angular positions around the central axis of the secondary battery, and
the first and second coils are interconnected that oppositely directed magnetic flux is generated by the first and second coils along respective winding axes of the first and second coils when a current flows through the first and second coils; and
a power feeding device including a power feeding coil and a power feeding device housing that contains the power feeding coil, wherein
the power feeding device housing includes a concave part having a circumference and at least partially accommodating the portable electronic device, and
the power feeding coil is helically wound around the circumference of the concave part.

16. The wireless electric power transmission device according to claim 15, wherein the power feeding device includes a cylindrical third magnetic body covering an outer circumference of the power feeding coil.

17. The wireless electric power transmission device according to claim 16, wherein the power feeding device includes
a fourth magnetic body extending from a first end portion of the third magnetic body toward an opening on a side of the first end portion of the third magnetic body, and
a fifth magnetic body extending from a second end portion of the third magnetic body toward an opening on a side of the second end portion of the third magnetic body.

18. The wireless electric power transmission device according to claim 17, wherein
the fourth magnetic body has an end side opening portion surrounding the concave part of the power feeding device housing,
the fifth magnetic body has an end side opening portion located on a bottom side of the concave part, and
opening width of the end side opening portion of the fourth magnetic body and opening width of the end side opening portion of the fifth magnetic body are both narrower than circumferential width of the power feeding coil.

19. The wireless electric power transmission device according to claim 18, wherein the opening width of the end side opening portion of the fifth magnetic body is narrower than the opening width of the end side opening portion of the fourth magnetic body.

* * * * *